United States Patent [19]

Wolfe

[11] Patent Number: 4,493,967

[45] Date of Patent: Jan. 15, 1985

[54] RIGID SUPPORT FOR LASER MACHINING APPARATUS

[75] Inventor: Donald L. Wolfe, Allison Park, Pa.

[73] Assignee: Westinghouse Electric Corp., Pittsburgh, Pa.

[21] Appl. No.: 414,191

[22] Filed: Sep. 1, 1982

[51] Int. Cl.³ .............................................. B23K 27/00
[52] U.S. Cl. .............................................. 219/121 LC
[58] Field of Search ................. 219/121 LC, 121 LD, 219/121 LH, 121 LJ, 121 LG, 121 LN, 121 LP, 121 LQ, 121 LR, 121 LY, 121 EQ, 121 EC, 121 ED, 121 EB, 121 EM, 121 L, 121 LM, 121 PG, 121 EL, 121 EN; 228/219

[56] References Cited

U.S. PATENT DOCUMENTS

| | | | |
|---|---|---|---|
| 3,112,391 | 11/1963 | Sciaky | 219/121 LT X |
| 3,612,814 | 10/1971 | Houldcroft | 219/121 LN X |
| 3,626,140 | 12/1971 | Peyrot | 219/121 LC X |
| 3,799,657 | 3/1974 | Dager et al. | 219/121 LN X |
| 3,803,379 | 4/1974 | McRay | 219/121 L |
| 4,083,629 | 4/1978 | Kocher et al. | 350/285 |
| 4,223,201 | 9/1980 | Peters et al. | 219/121 LC |
| 4,223,202 | 9/1980 | Peters et al. | 219/121 L |

Primary Examiner—C. L. Albritton
Attorney, Agent, or Firm—D. E. Erickson

[57] ABSTRACT

A laser machining apparatus is disclosed as including a bed lying on a floor surface for supporting a source of a laser beam with respect to a work piece supported upon the bed. The bed is of a rigid construction and defines a substantially planar, reference surface for supporting at least one machining chamber for receiving and establishing about the work piece an environment that is non-reactive to the material of which the work piece is made. A work piece housing is fixedly attached to the reference surface for defining a second, substantially planar sealing surface with respect to the reference surface. An adjusting mechanism in the illustrative form of a finely threaded screw serves to accurately position the machining chamber and in particular a peripheral flange thereof to provide a uniform gap between the peripheral flange and the sealing surface in a manner to permit ready movement of the machining chamber with respect to the sealing surface. The machining chamber is mounted on a platform and once adjusted by the adjusting mechanism, is affixedly attached by suitable fasteners to the work piece housing. The laser source is mounted upon a frame fixedly attached to the reference surface of the bed. In particular, the laser source is disposed upon a laser subbase which defines a second substantially planar surface and is structurally rigid, whereby positioning means may position the subbase so that the emitted laser beam is accurately and rigidly disposed with respect to the first reference surface and therefore, the workpiece.

18 Claims, 25 Drawing Figures

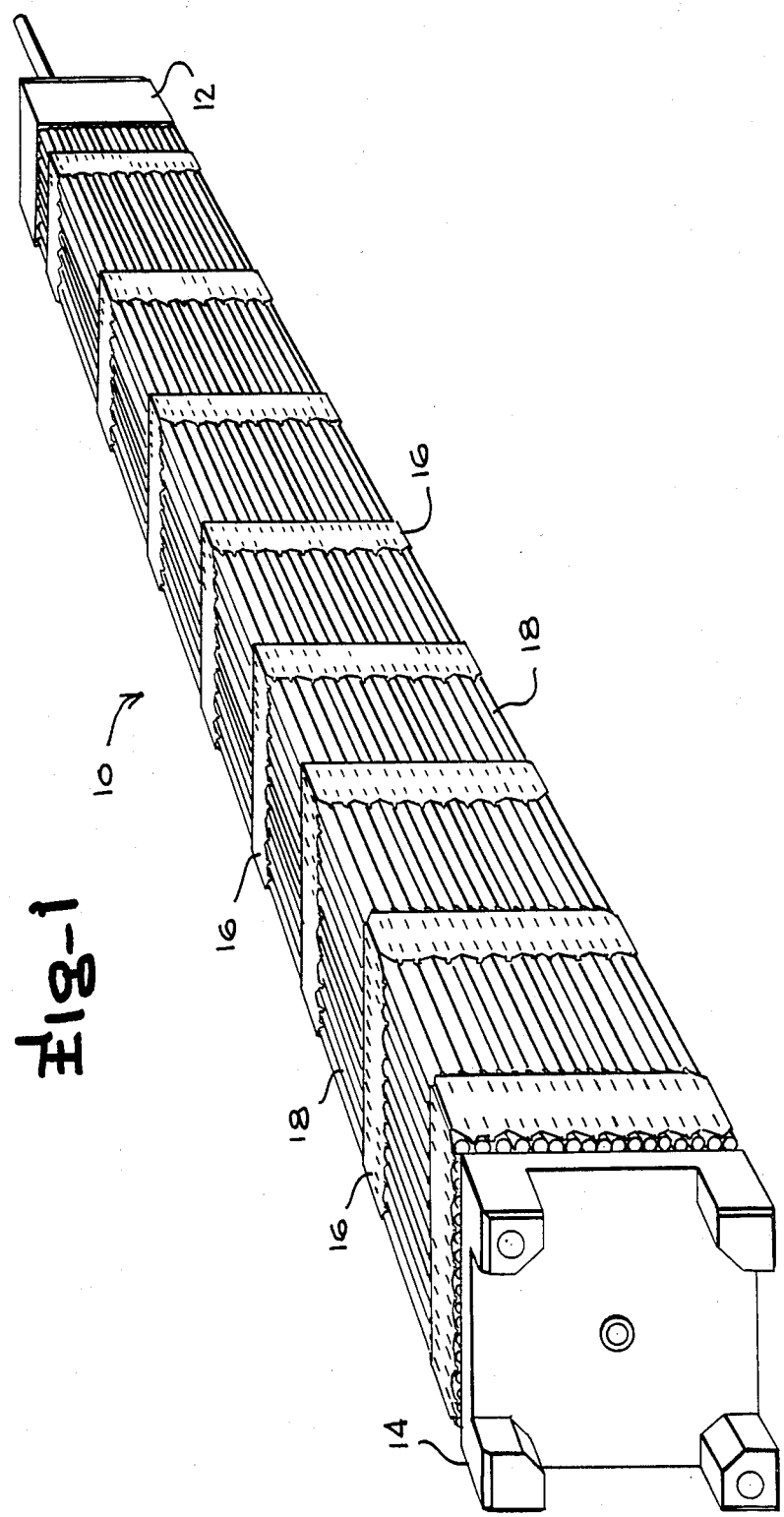

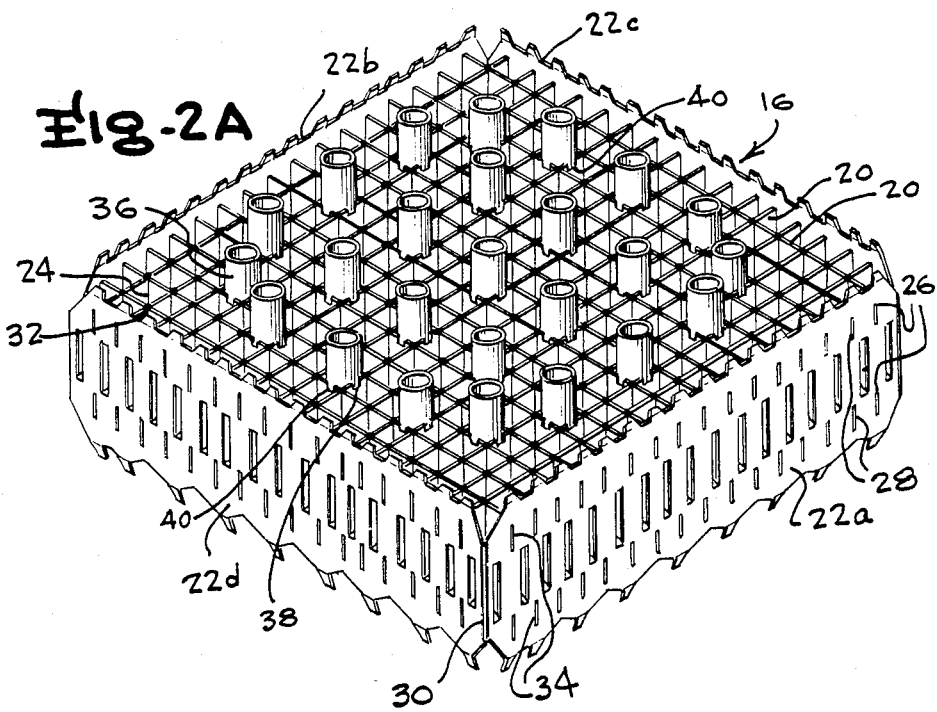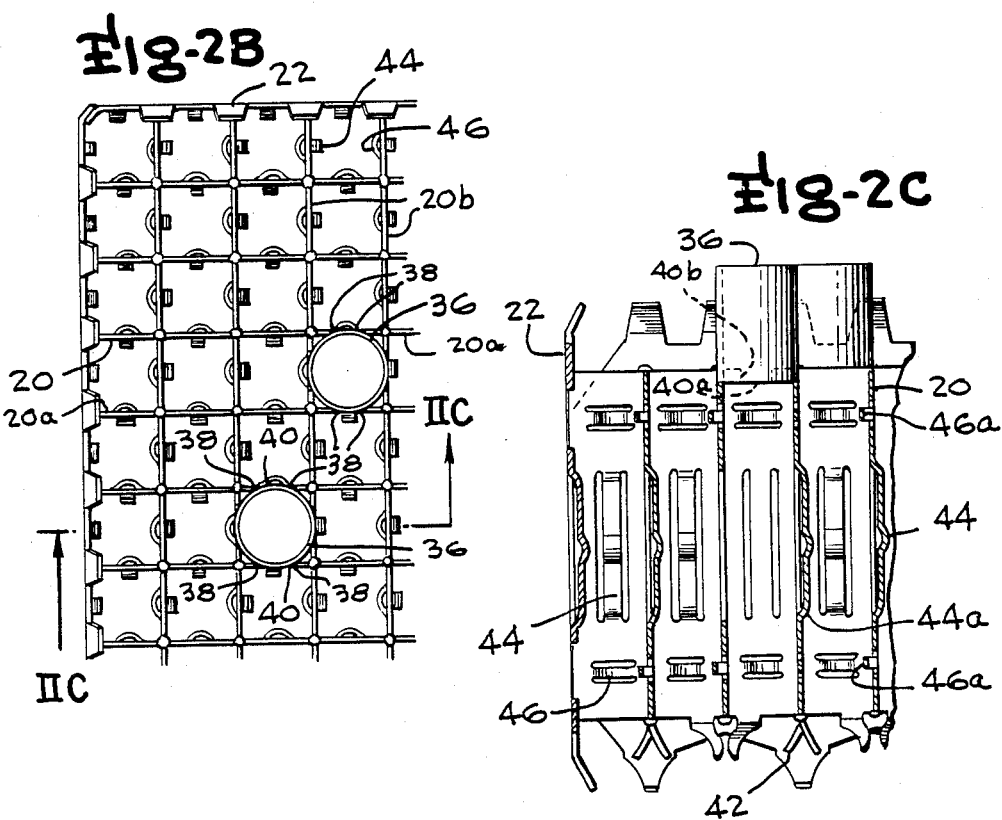

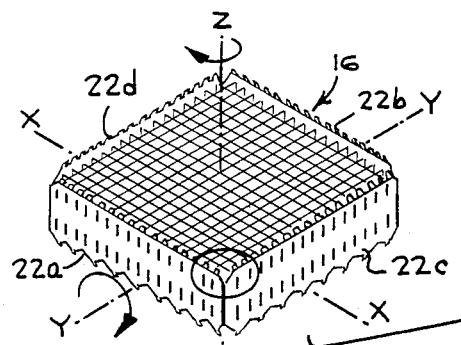
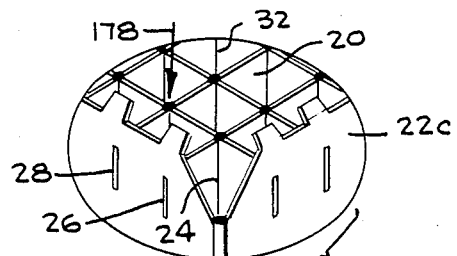
Fig-3E
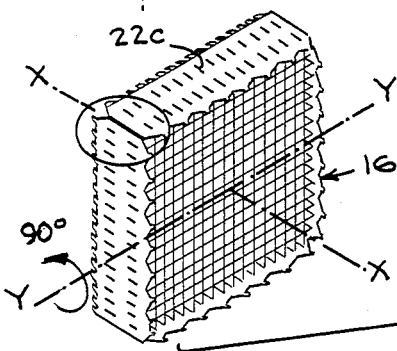
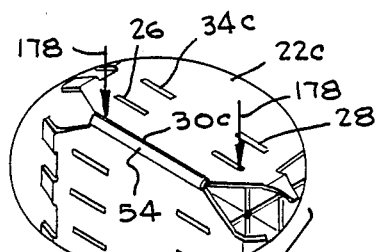
Fig-3F
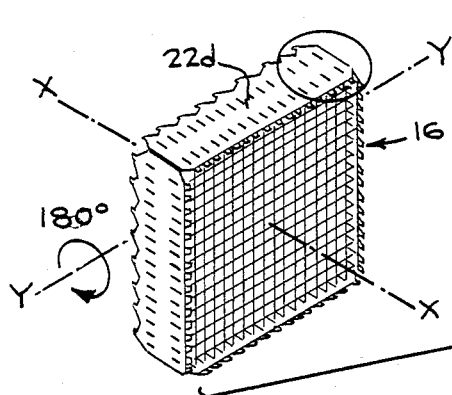
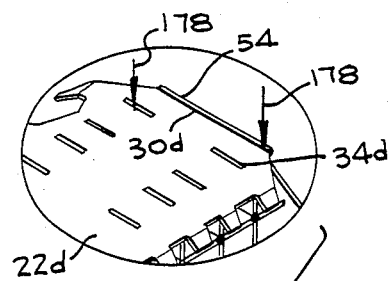
Fig-3G
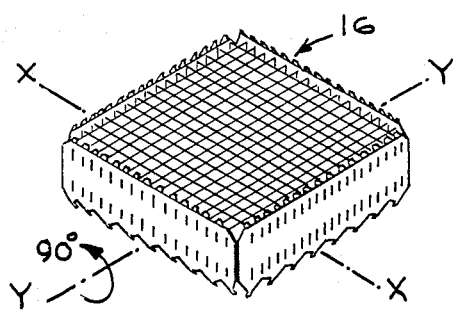
Fig-3H

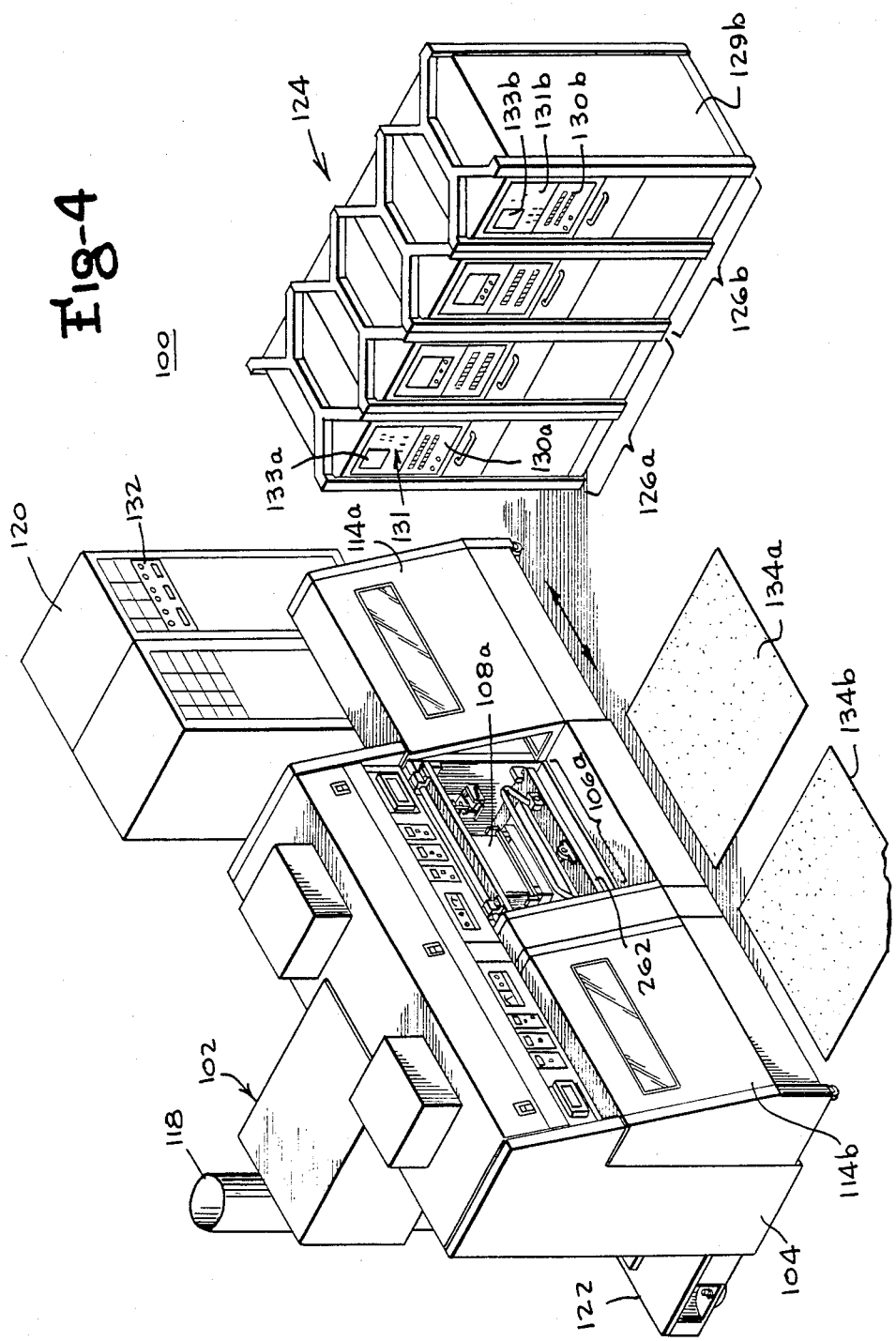

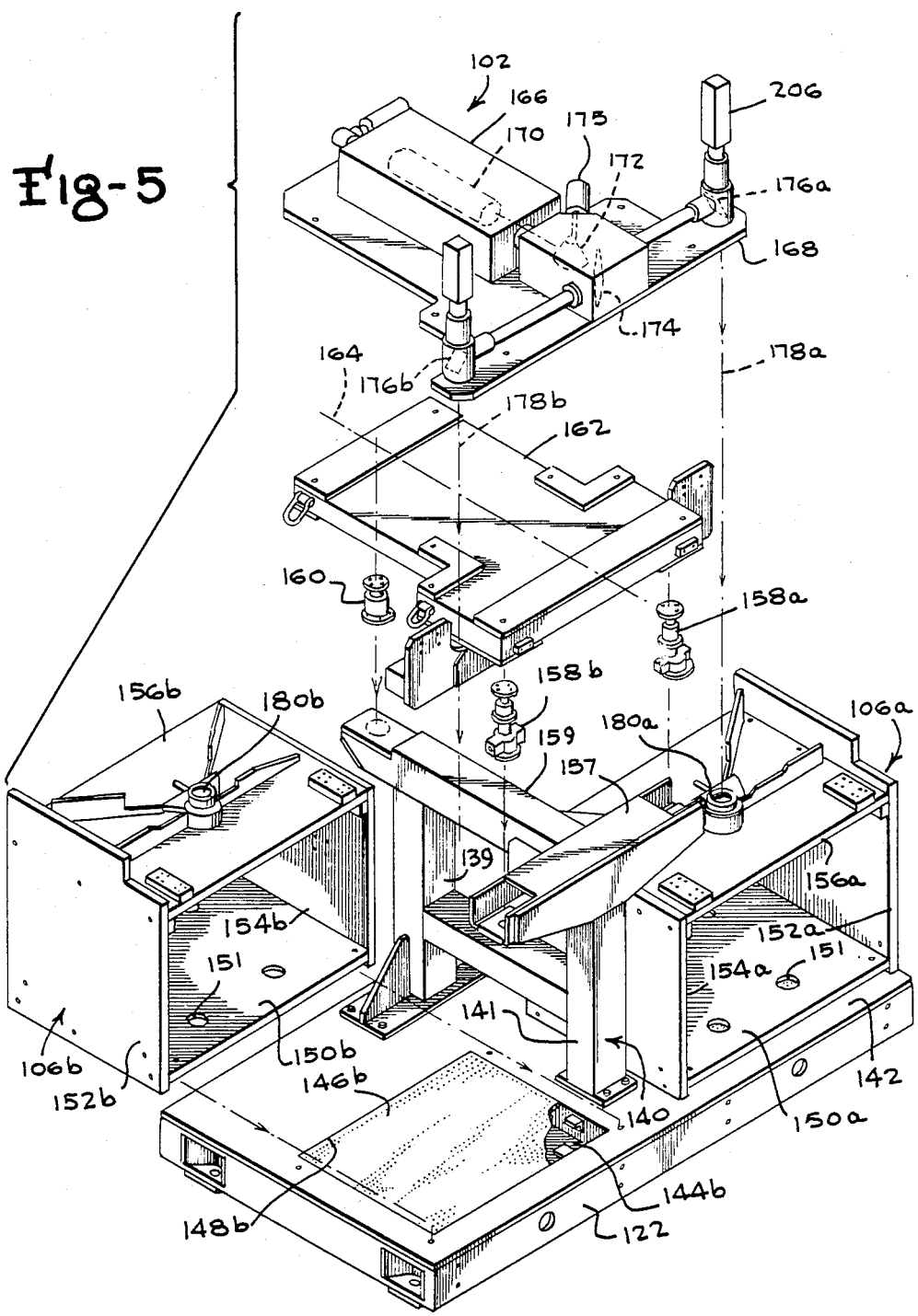

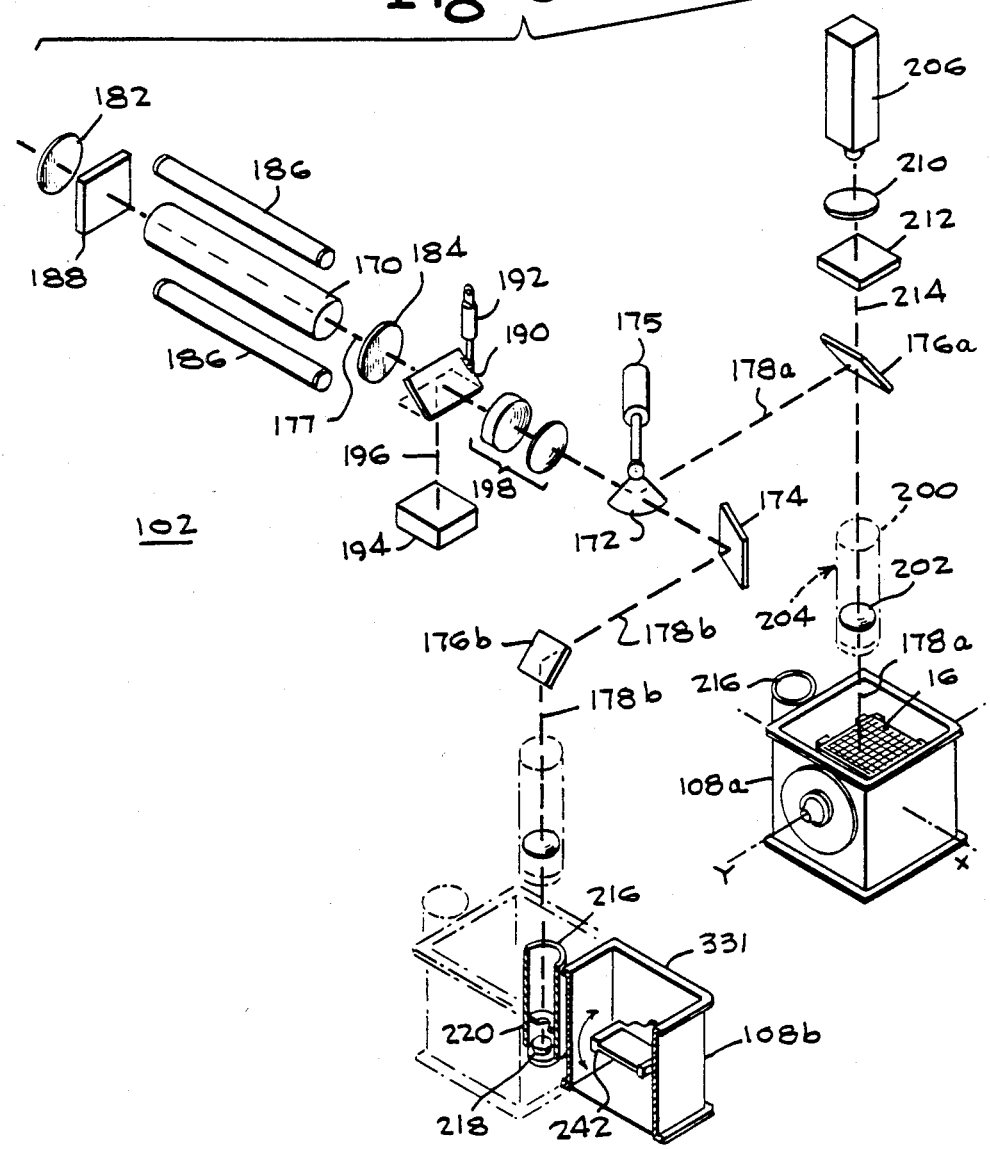

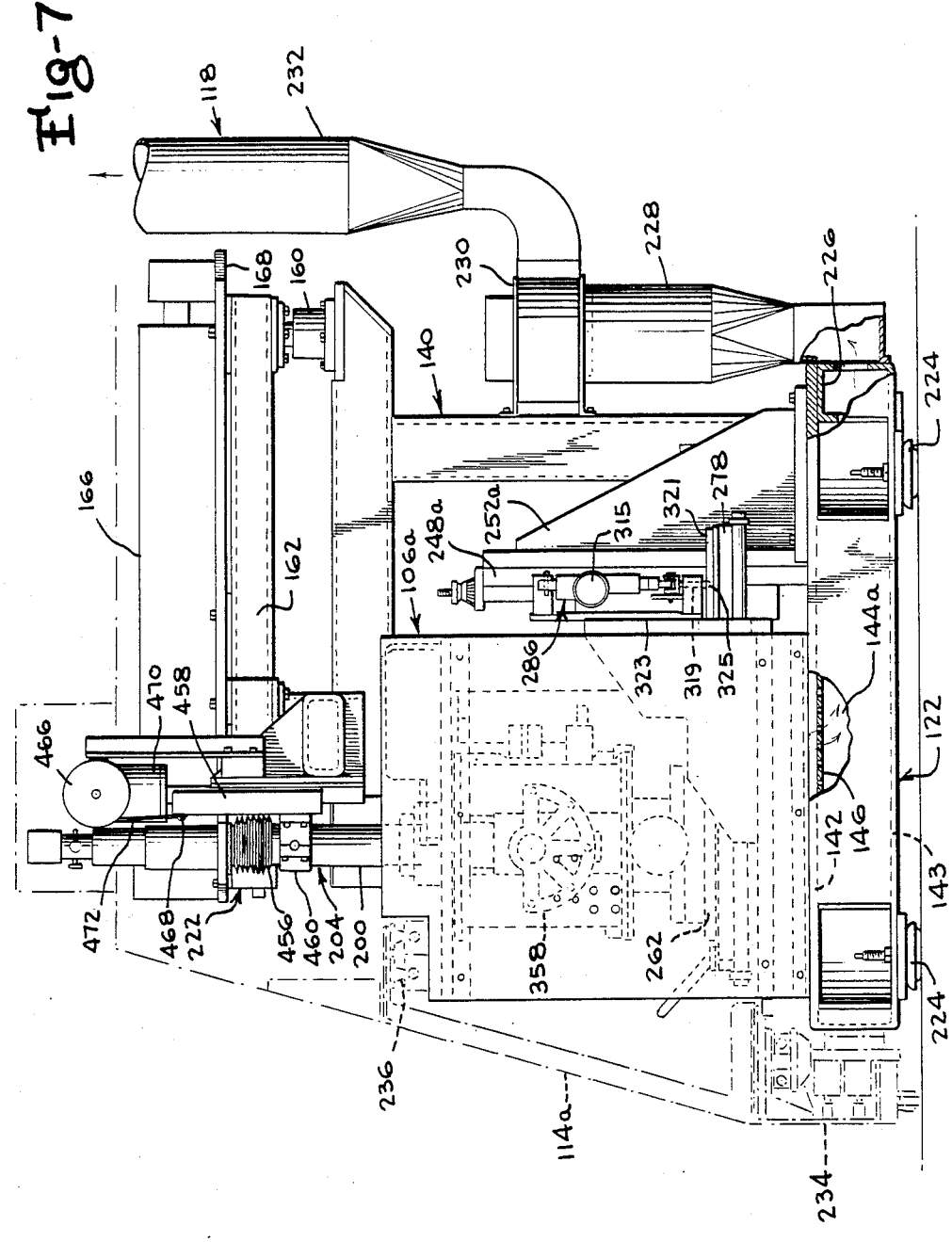

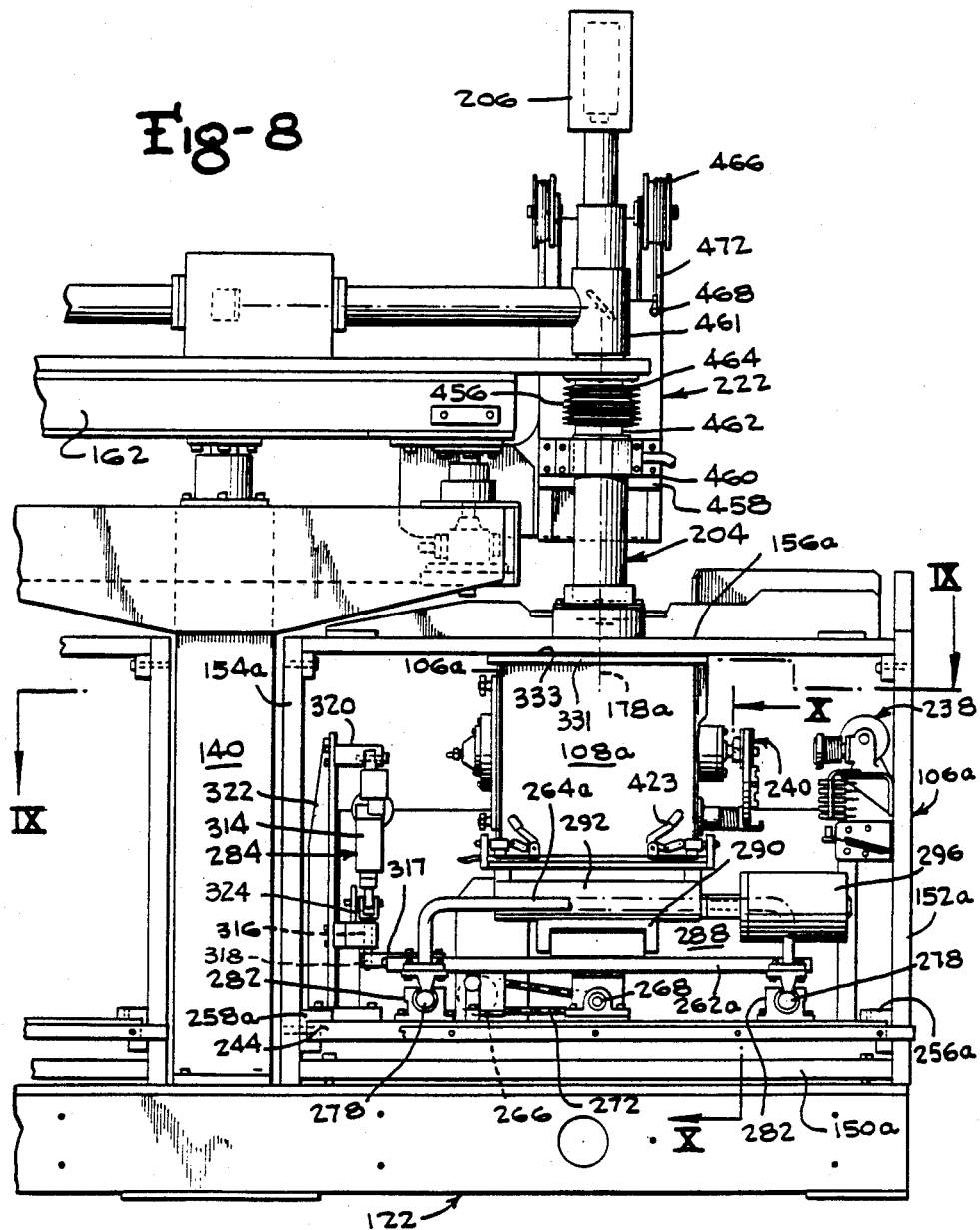

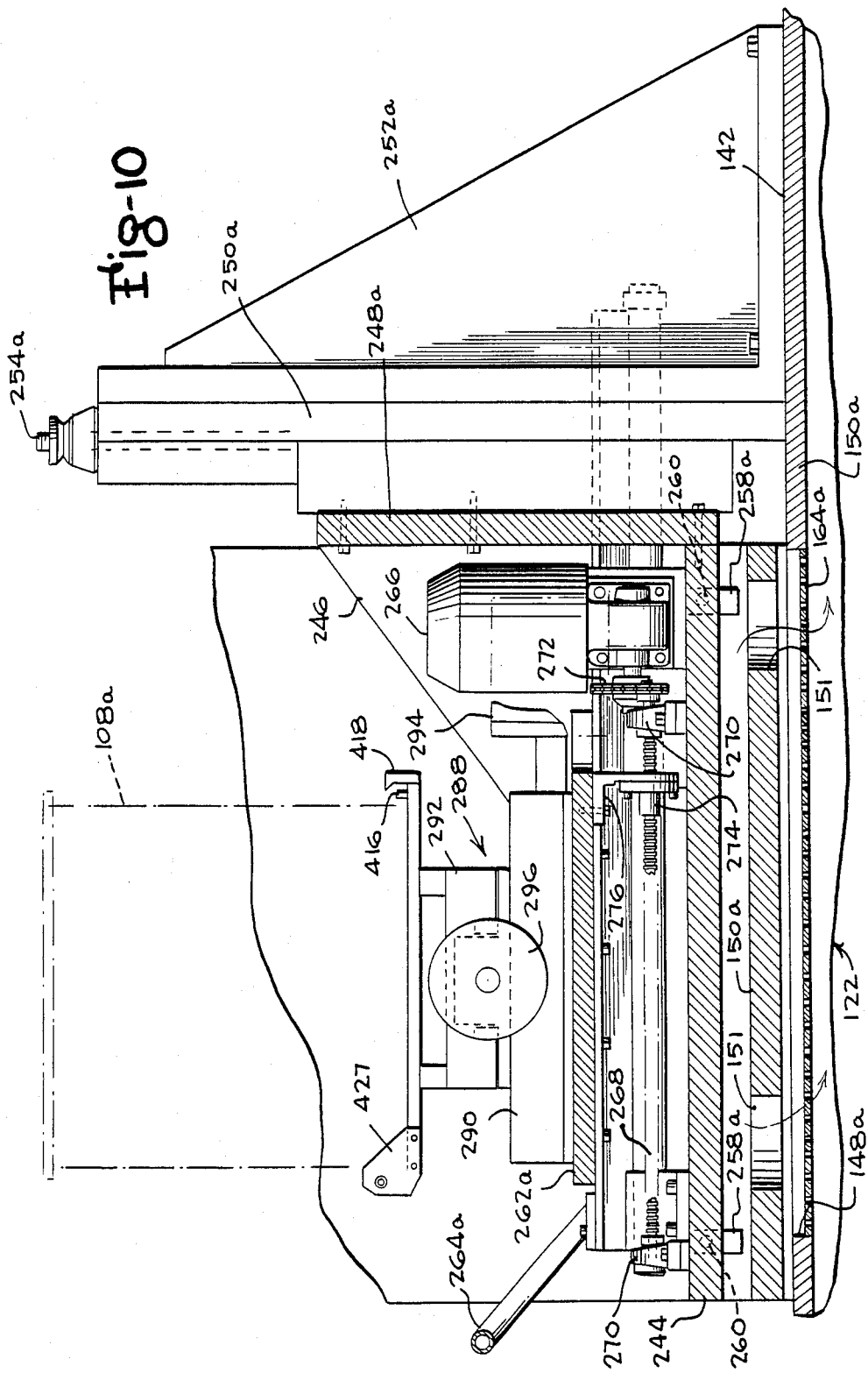

RIGID SUPPORT FOR LASER MACHINING APPARATUS

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS" (Westinghouse Case No. 49,420), by R. Duncan, Ser. No. 414,232;

(2) "PULSED LASER MACHINING APPARATUS" (Westinghouse Case No. 49,422), by R. A. Miller and G. D. Bucher, Ser. No. 414,264;

(3) "APPARATUS AND METHOD FOR LASER MACHINING IN NON-REACTIVE ENVIRONMENT" (Westinghouse Case No. 49,720), by R. A. Miller and G. G. Lessman, Ser. No. 414,242;

(4) "STRAP AND VANE POSITIONING FIXTURE FOR FUEL ROD GRID AND METHOD" (Westinghouse Case No. 49,721), by R. F. Antol, R. W. Kalkbrenner and R. M. Kobuck, Ser. No. 414,197;

(5) "GRID ASSEMBLY FIXTURE, RETENTION STRAP AND METHOD" (Westinghouse Case No. 49,722), by R. M. Kobuck and R. W. Kalkbrenner, Ser. No. 414,198;

(6) "LASER MACHINING SYSTEM" (Westinghouse Case No. 49,723), by D. L. Wolfe, J. W. Clements and J. S. Kerrey, Ser. No. 414,241;

(7) "MOVABLE MACHINING CHAMBER WITH ROTATABLE WORK PIECE FIXTURE" (Westinghouse Case No. 49,938), by R. F. Antol, R. Kalkbrenner and D. L. Wolfe, Ser. No. 414,263;

(8) "WORKPIECE GRIPPING AND MANIPULATING APPARATUS FOR LASER WELDING SYSTEMS AND THE LIKE" (Wesinghouse Case No. 49,961), by R. Kalkbrenner and R. Kobuck, Ser. No. 414,262;

(9) "LASER LENS AND LIGHT ASSEMBLY" (Westinghouse Case No. 50,106), by R. Antol, R. Kalkbrenner and R. Kobuck, Ser. No. 414,205;

(10) "WELDING PLATES FOR A FUEL ROD GRID" (Westinghouse Case No. 50,107), by R. M. Kobuck, R. Miller, R. W. Kalkbrenner, J. Kerrey and R. Duncan, Ser. No. 414,265;

(11) "PLURAL COMPUTER CONTROL FOR SHARED LASER MACHINING" (Westinghouse Case No. 50,288), by J. W. Clements and W. D. Lanyi, Ser. No. 414,204;

(12) "GRID AND SLEEVES WELDING FIXTURE AND METHOD" (Westinghouse Case No. 50,528), by J. S. Kerrey and R. Duncan, Ser. No. 414,203;

(13) "CALIBRATION OF AUTOMATED LASER MACHINING APPARATUS" (Westinghouse Case No. 50,529) by J. W. Clements and J. R. Faulkner, Ser. No. 414,272;

BACKGROUND OF THE INVENTION

1. Field of the Invention:

This invention, in its preferred form, relates to apparatus for laser machining apparatus and more particularly, to a rigid structure for such laser machining apparatus, wherein the laser source is accurately positioned and rigidly mounted with respect to a work piece to be machined. More particularly, this invention relates to apparatus for welding elements made of a volatile material such as Zircaloy, disposed in a machining chamber in a manner to maintain the purity of an environment substantially non-reactive to the material which the work piece is made, and to ensure that the machining chamber and the work piece therein are readily movable with respect to the laser beam.

2. Description of the Prior Art:

The precision laser machining apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

The precision laser machining apparatus of this invention is, in one illustrative embodiment thereof, related to the manufacture of fuel rod grids 16 as shown in FIGS. 2A to 2E. The fuel rod grid 16 is of an approximately square configuration, whose periphery is formed by four outer grid straps 22. Each end of an outer grid strap 22 is welded by a corner seam weld 30 to the end of a perpendicularly disposed outer grid strap. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grid straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22. Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34 and 40 is carried out. The precision laser welding apparatus of this invention not only controls the various parameters of generating the laser in terms of the pulse width, the pulse height of each laser pulse, and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The manner of assembling the inner grid straps 20 to each other as well as to the outer grid straps 22 is shown in FIG. 2D. Each of the inner grid straps 20 includes a plurality of complementary slots 52. An upper grid strap 20a has a downwardly projecting slot 52a, whereas a lower grid strap 20b has a plurality of upwardly oriented slots 52b of a configuration and size to be received within a corresponding slot 52a of the inner grid strap 20a. At each end of the inner grid strap 20, there is disposed a pair of the tabs 26 to be disposed within corresponding slots 28 of an outer grid strap 22.

As will be explained in detail later, the inner grid straps 20 are welded to each other by the intersect welds 32 as formed of projection tabs 48 and tab portions 50a and 50b. More specifically, a projection tab 48 is disposed between a corresponding set of tab portions 50a and 50b when the inner grid straps 20a and 20b are assembled together. Upon the application of a laser beam to the tab 50a and tab portions 48 and 50b, an intersect weld 32 is formed that is rigidly strong and free of contamination in accordance with the teachings of this invention. Further, each end of an outer grid strap 22 has a corner tab 54. As shown in FIG. 2D, the outer grid straps 22c and 22b have respectively corner tabs 54b and 54c that overlap each other and are seam welded together to form the corner seam weld 30.

The vanes 42 project, as seen in FIGS. 2C and 2E, from a vane side of the fuel rod grid 16 to enhance the turbulence of the water passing over the nuclear fuel rods 18. Further, as illustrated particularly in FIG. 2C, the guide sleeves 36 are aligned with cells formed by the inner grid straps 20 that are free of either a resilient finger 44 or spacing finger 46, to thereby permit the free movement of the control rod through the cell and through the guide sleeve 36.

Laser machining systems have been adapted for precision work including the cutting of semiconductor assemblies. When lasers are applied to such high precision machining operations, it is important that the relative position between the laser and the work piece, and more particularly between the laser and the work piece holding assembly, be accurately and precisely maintained. Unlike a mechanical tool, which is brought into actual contact with the work piece, a laser is removed from its work piece by a relatively great distance. In such laser machining systems, the work holding means is disposed at a relatively great distance from the laser. In such machines, any relative movement between the work holding means and the laser is amplified by the support structure, causing relatively large movement of the laser beam with respect to the work piece, and thus reducing the accuracy with which the laser beam is focused onto the work piece. Relative vibrations between the laser and the work holding means is serious in proportion to the desired small cross section of the laser beam at the work piece. With accuracies measured in thousandths of an inch or less, it is seen that if there is relative vibration, the focused beam will likewise be vibrated, such vibration being amplified by the structural support system by which the laser and the work piece position means are coupled together. For these reasons, vibration has resulted in problems in obtaining the desired accuracy in laser machining, especially where laser beams are focused to very fine points. Such accurate focusing of the laser beam is advantageously done over a relatively long focal length but increases the difficulty of achieving accurate machining due to vibration and shocks. U.S. Pat. No. 3,803,379 of McKay suggests the use of a rigid construction of a laser optical system mounting bed and a work piece holding frame. In particular, the bed is constructed as a hollow box and interconnected by locator pins forced fit through holes in one member and being threaded in the other member. In addition, the laser mounting bed and the work piece holding frame are mounted on vibration isolating pads to support the entire weight of the bed on a rigid floor.

In the initial development of laser machining systems, lasers were employed for individual, low production machining operations. Typically, single machining operations, e.g. welding, were carried out on a single work piece, one at a time. In order to improve the laser machining rate of the work pieces, the prior art as illustrated by U.S. Pat. Nos. 4,223,201 and 4,223,202 of Peters et al., and U.S. Pat. No. 4,083,629 of Kocher et al., disclose a time sharing of a laser beam emitted from a single laser to be alternately directed along first and second optical paths onto a single work piece. In accordance with the teachings of this invention, the machining rate is further improved by time sharing of a single laser to be directed along first and second optical paths from the laser source to first and second work stations.

In addition, the problems of mounting the laser source with respect to not only one but two work pieces is further complicated by making the work piece of a volatile material such as Zircaloy. It is contemplated that unless the laser machining of such a volatile material is carried out in a substantially pure environment, e.g. an inert gas such as argon, the work piece will be contaminated. In the particular example wherein it is desired to laser weld a Zircaloy work piece, it is contemplated that unless the welding environment is of the highest purity, that any resultant weld will be subject to contamination and that such a weld when subjected to the harsh environment of a nuclear generator will rapidly deteriorate and structurally fail. In one illustrative embodiment of this invention, the work piece as suggested above takes the form of the fuel rod grid 16 for mounting and spacing critically fuel rods within a nuclear generator. If the welds of the fuel rod grid were contaminated, such contamination would lead to the structural failure of the fuel rod grid in such a harsh environment, whereby the flow of water as directed through the nuclear fuel bundle assembly would cause the fuel rods to vibrate against each other with the almost certain result that the fuel rods would rupture and the nuclear material therein be discharged into the circulating water. To prevent this result, the laser welding is carried out in accordance with the teachings of this invention in a welding chamber that maintains the machining environment therein of sufficient purity to prevent the undesired contamination, but also to permit the machining chamber and the work piece disposed therein to be controllably moved with respect to the laser beam. In this manner, the laser source and the work piece positioning means may be disposed under the automated control of the computer to thereby further increase the machining rate of the work pieces.

SUMMARY OF THE INVENTION

It is therefore an object of this invention to provide a new and improved laser machining apparatus and in particular a rigid structure for accurately and rigidly mounting a laser source with respect to the article to be machined.

It is a more specific object of this invention to provide a new and improved laser machining apparatus and in particular, a rigid structure for receiving and supporting plural work pieces in a precisely aligned position with respect to the laser source.

It is a further object of this invention to provide a new and improved laser machining apparatus and in particular, a rigid structure for adjustably mounting a laser source so that its position may be accurately disposed with respect to the work piece to be machined.

It is a still further object of this invention to provide a new and improved laser machining apparatus for rigidly supporting a machining chamber for maintaining an environment non-reactive to the material of which the work piece is made and for supporting the work piece in a manner to be relatively movable with respect to the laser beam.

In accordance with these and other objects of this invention, there is disclosed laser machining apparatus in accordance with the teachings of this invention as including a bed lying on a floor surface for supporting a source of a laser beam with respect to a work piece supported upon the bed. The bed is of a rigid construction and defines a substantially planar, reference surface for supporting at least one machining chamber for receiving and establishing about the work piece an environment that is non-reactive to the material of which the work piece is made. A work piece housing is fixedly attached to the reference surface for defining a second, substantially planar sealing surface with respect to the reference surface. An adjusting mechanism in the illustrative form of a finely threaded screw serves to accurately position the machining chamber and in particular a peripheral flange thereof to provide a uniform spacing between the peripheral flange and the sealing surface in a manner to permit ready movement of the machining chamber with respect to the sealing surface. The machining chamber is mounted on a platform and once adjusted by the adjusting mechanism, is affixedly attached by suitable fasteners to the work piece housing.

In a further aspect of this invention, the laser source is mounted upon a frame fixedly attached to the referenced surface of the bed. In particular, the laser source is disposed upon a laser subbase which defines a second substantially planar surface and is structurally rigid, whereby positioning means may position the subbase so that the emitted laser beam is accurately and rigidly disposed with respect to the first reference surface and therefore, the work piece. In an illustrative embodiment of this invention, the positioning mechanism comprises a first bearing surface fixedly attached to the mounting frame and a pair of adjustable mechanisms disposed on either side of a subbase axis co-incident with the bearing surface, whereby each of the adjustable mechanisms may be raised or lowered to not only position the height of the laser subbase, but also to pivot the subbase about its axis.

In a still further feature of this invention, there is included two work stations and in particular, two machining chambers both adjustably disposed with respect to their sealing surfaces. The laser subbase permits an adjustment about its axis, whereby the emitted laser beam may be precisely directed to both machining chambers. In an illustrative embodiment of this invention, a single laser source is time shared in a manner to direct its laser beam along a first laser path to the first machining chamber at a first instant in time and along a second laser path to the second machining chamber at a second instant in time. To this end, a beam directing mechanism in the form of a rotating mirror is disposed to intercept the laser beam emitted from the single laser source and to direct the laser beam along its first and second paths sequentially. All of the laser source, beam directing mechanism and focusing mechanisms are mounted upon the laser subbase. A laser lens assembly is also associated with each laser path and is coupled to a drive motor for focusing independently its laser beam onto its work piece.

In a still further aspect of this invention, a mechanism is provided for moving its machining chamber along axes that define a surface substantially parallel with the sealing surface, whereby the work piece carried by the machining chamber may be moved in a sequence of steps with respect to the laser beam. The aforementioned spacing between the sealing surface and the peripheral flange of the machining chamber permits the desired movement of the machining chamber and the laser beam.

BRIEF DESCRIPTION OF THE DRAWINGS

A detailed description of a preferred embodiment of this invention is hereafter made with specific reference being made to the drawings in which:

FIG. 1 is a perspective view of a nuclear fuel bundle assembly incorporating a plurality of grids made in accordance with the teachings of this invention;

FIGS. 2A-2E are respectively a perspective view, a plan view, a sectioned side view, a perspective exploded view, and a plan view of a fuel rod grid made in accordance with the teachings of this invention and incorporated into the assembly of FIG. 1;

FIGS. 3A-3L show in a series of perspective views the sequence of steps for welding the nuclear rod grid as shown in FIG. 2;

FIG. 4 is a perspective view of the precision laser welding apparatus in accordance with the teachings of this invention;

FIG. 5 is an exploded perspective view of the structural support system for the laser welding apparatus as shown in FIG. 4 and including a main frame and a kinematic support for rigidly supporting a laser system with respect to a pair of work pieces, e.g. nuclear fuel rod grids, as positioned by left and right positioning modules;

FIG. 6 is a perspective, schematic representation of the laser system as incorporated into the precision laser welding apparatus as shown in FIGS. 4 and 5 for directing on a time shared basis a laser beam emitted from a single laser source to each of two work pieces, e.g. nuclear fuel rod grids;

FIG. 7 is a side elevational view of the laser welding system as shown in FIG. 4;

FIG. 8 is a partial front elevational view of the laser welding system as shown in FIG. 4;

FIG. 10 is a side, sectioned view taken along line X—X of FIG. 8.

DESCRIPTION OF THE PREFERRED EMBODIMENT

Figure 2D:
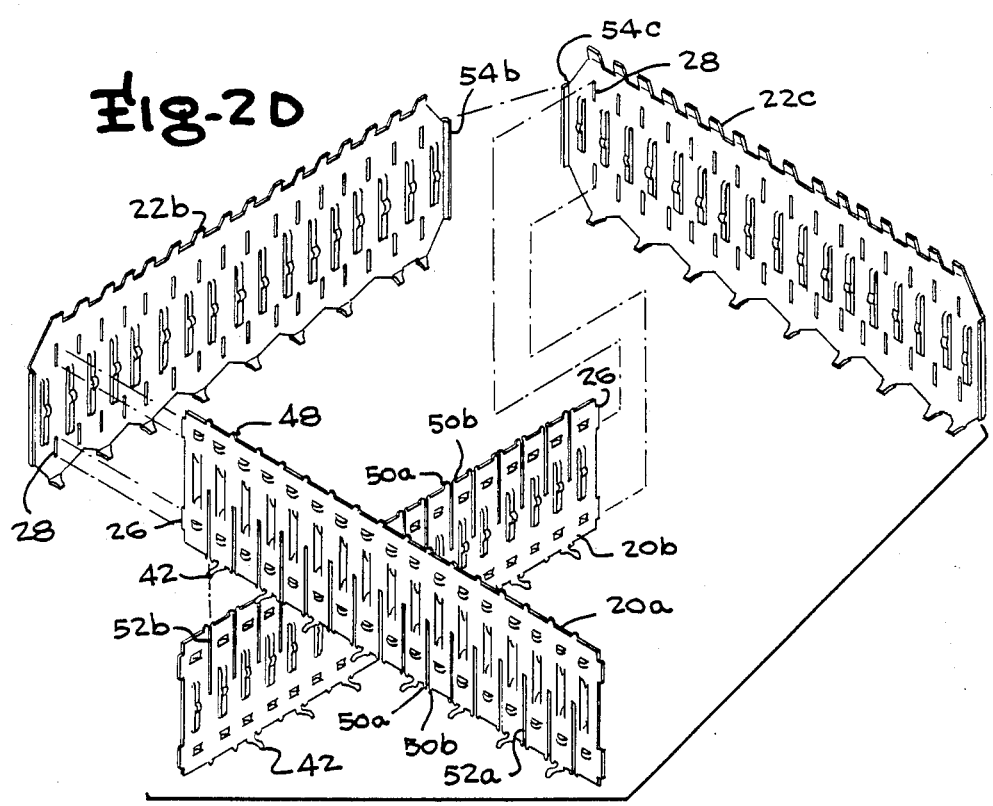
Figure 2E:
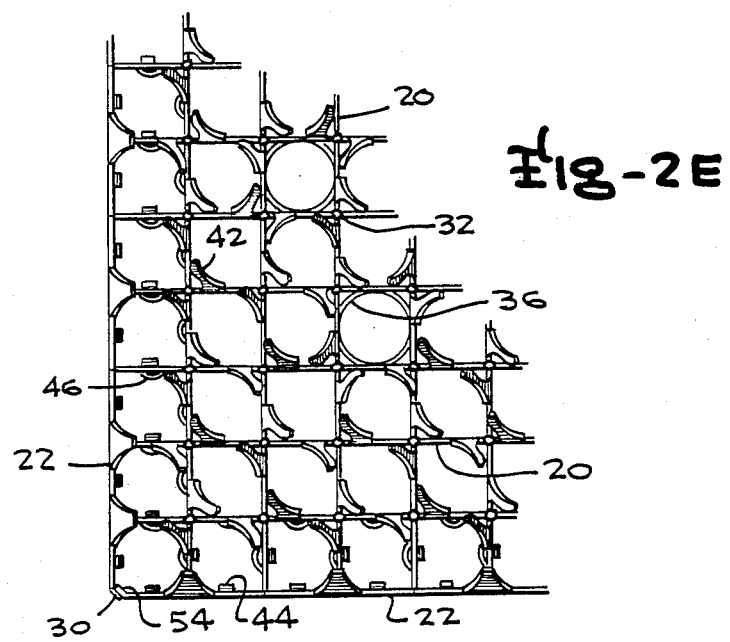
Figure 3A:
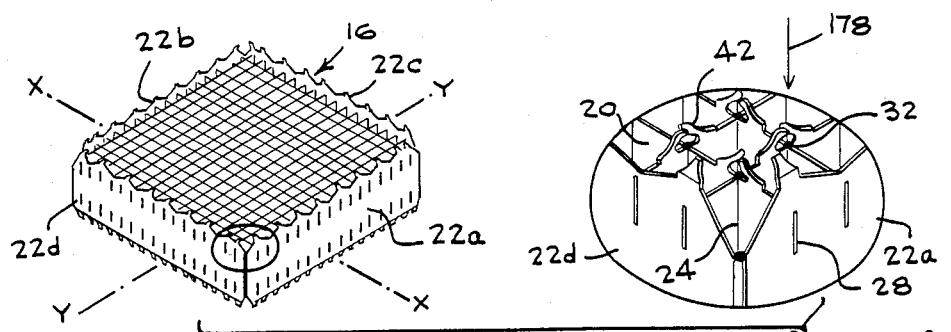

The fuel rod grids 16 are comprised as described above of the inner and outer grid straps 20 and 22 that are assembled and welded together as shown in FIGS. 2A to 2E. Each of the grid straps 20 and 22 is punched from a continuous roll of slit material and accumulates some surface oil in the punching operation. The oil film is cleaned and thereafter, the strap is annealed and then assembled into a work fixture as described in copending application entitled "GRID ASSEMBLY FIXTURE, RETENTION STRAP AND METHOD" (Westinghouse Case No. 49,722). Thereafter, the grid 16 and fixture are welded by the laser welding system 100 of this invention which carries out each of the intersect welds 32, the corner seam welds 30, the slot and tab welds 34, and the notch seam welds 40 in a pure atmosphere of an inert gas. Referring now to FIGS. 3A to 3L, the sequence of the welding steps in the inert gas is described in accordance with the teachings of this invention. The laser welding system 100 will be described in detail later; it is believed that an understanding of the manner in which the work piece, i.e. the fuel rod grid 16, is manipulated in each of three dimensions will facilitate an understanding of the operation of the laser welding system 100. As is apparent from these drawings, the fuel rod grid 16 is incrementally moved along its X and Y axes within a plane and is selectively rotated about its Y axis. Significantly, the aforementioned motion is carried out within a chamber wherein the atmosphere of the inert gas is maintained to a high degree of purity. The first step is illustrated in FIG. 3A, wherein the fuel rod grid 16 is disposed within the controlled atmosphere as formed by the welding chamber with its vanes 42 extending upwardly. A welding fixture is described in the copending application entitled "WELDING PLATES FOR A FUEL ROD GRID" (Westinghouse Case 50,107), whereby the inner and outer grid straps 20 and 22 are fixedly disposed with respect to each other during the welding operations. A vane suppressor fixture is a tool that is used for deflecting the vanes 42, whereby the vanes are fitted within the welding fixture; the vane suppressor fixture is described in the copending application entitled "STRAP AND VANE POSITIONING FIXTURE FOR FUEL ROD GRID AND METHOD" (Westinghouse Case No. 49,721). The atmosphere is purified by directing argon gas into the welding chamber until the desired degree of purity is reached, i.e. 10 ppm of water and 7 ppm oxygen. When the pure atmosphere has been established, the fuel rod grid 16 is moved in a series of incremental movements along the X and Y axes, whereby each of the points 24 of intersection between inner grid straps 20 is aligned with a laser beam 178 and thereafter, a controlled amount of energy is imparted thereto to effect the intersect weld 32. As will be explained in detail later, the laser beam 178 is provided by a pulsed Nd:YAG laser that is excited by pulsed excitation lamps energized by a calibrated reservoir voltage to deliver a specified level of energy to the grid 16. In particular, the number of pulses directed onto the point 24 of intersection of the inner grid straps 20 is controlled so that six pulses of the laser beam are directed onto the work piece to form the intersect weld 32, each pulse having a pulse width of 6.2 ms, a rate of 20 pulses per second (pps), an average power of 350 watts, and a peak power of 2,580 watts. The intersect welds 32 are formed by turning on the laser beam 178 when the fuel rod grid 16 has been disposed in an aligned position with respect to the laser beam 178.

Figure 3B:
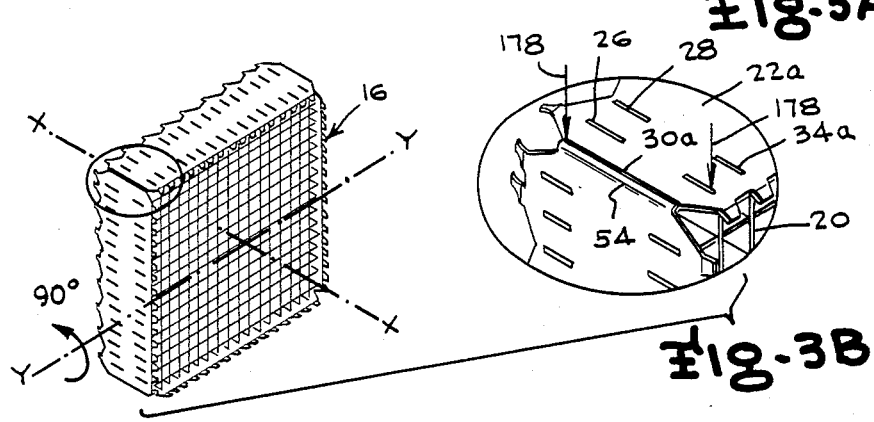

The next step is shown in FIG. 3B, wherein the fuel rod grid 16 is rotated about its Y axis 90° by a mechanism to be explained, whereby a first set of the slot and tab welds 34 and a first corner seam weld 30 are performed. These welds are seam welds which are carried out by moving the fuel rod grid 16 along its X axis while directing the laser beam 178 onto the work piece. In an illustrative embodiment of this invention, the slot and tab welds 34 are effected with a laser beam 178 of a pulse width of 2.2 ms, a pulse frequency of 50 pps, and an average of 350 watts, with the fuel rod grid 16 being moved at a rate of 30 inches per minute (IPM). FIG. 3B shows the relative position of the laser beam 178 to effect each of the slot and tab welds 34a and the corner seam weld 30a.

Figure 3C:
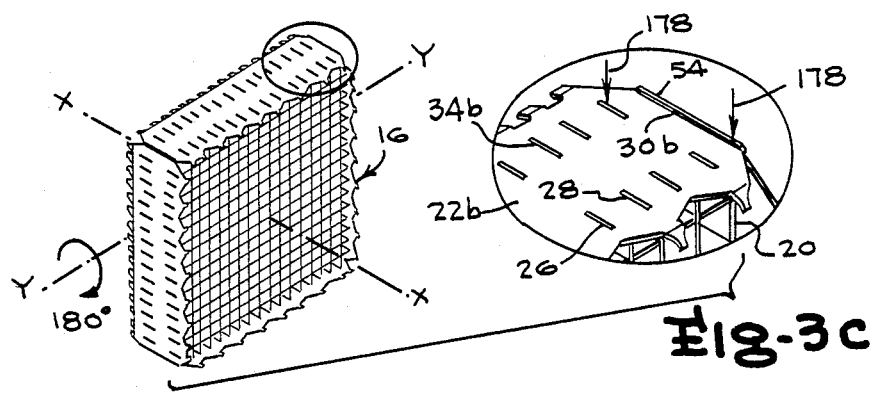
Figure 3D:
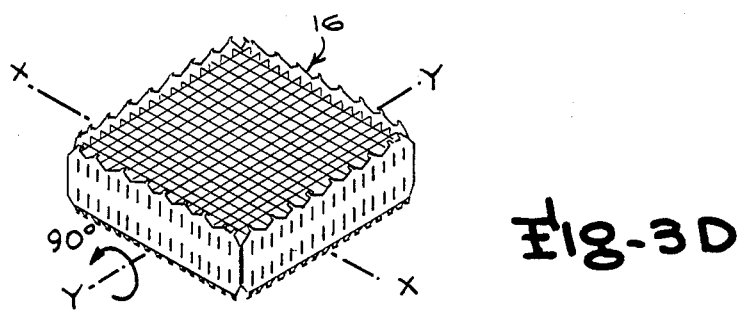
Figure 3I:
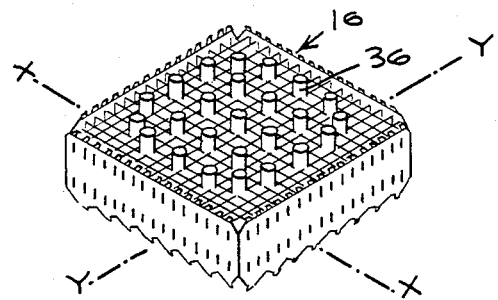

Next, as shown in FIG. 3C, the fuel rod grid 16 is rotated in a clockwise direction so that the opposing outer grid strap 22b is aligned with respect to the laser beam 178, whereby a second set of slot and tab welds 34b and a second corner seam weld 30b may be carried out. Thereafter, as shown in FIG. 3D, the fuel rod grid 16 is rotated 90° counter-clockwise to its original position as shown in FIG. 3A, and the fuel rod grid 16 and its weld fixture are removed from the welding chamber.

As shown in FIGS. 3E to 3H, a similar set of welding steps are carried out. After removal from the chamber, the fuel rod grid 16 and its weld fixture are turned over to dispose its vane side down and are rotated about its Z axes 90° in clockwise direction so that the unwelded outer grid strap 22c faces the door of the welding chamber. The grid 16 and its weld fixture are locked into a secure position with respect to the welding chamber and the laser beam. Initially, the air within the welding chamber is purged with argon gas to an acceptable level of purity. Thereafter, as shown in FIG. 3E, the fuel rod grid 16 is incrementally moved through a series of steps along the X and Y axes, whereby each of the intersect welds 32 is effected as described above. After the completion of the intersect welds 32, the fuel rod grid 16 is rotated 90° in a counter-clockwise direction about its Y axis so that its outer grid strap 22c is brought beneath the laser beam 178, whereby a third set of slot and tab welds 34c is carried out and a third corner seam weld 30c effected. Next, as shown in FIG. 3G, the fuel rod grid 16 is rotated 180° about its Y axis to present the fourth outer grid strap 22d to the laser beam 178, whereby a fourth set of slot and tab welds 34d, and a fourth corner seam weld 30d may be carried out. Thereafter in the step as shown in FIG. 3H, the fuel grid 16 is rotated 90° in a counter-clockwise direction to its original position before it and its weld fixture are removed from the welding chamber.

Figure 3J:
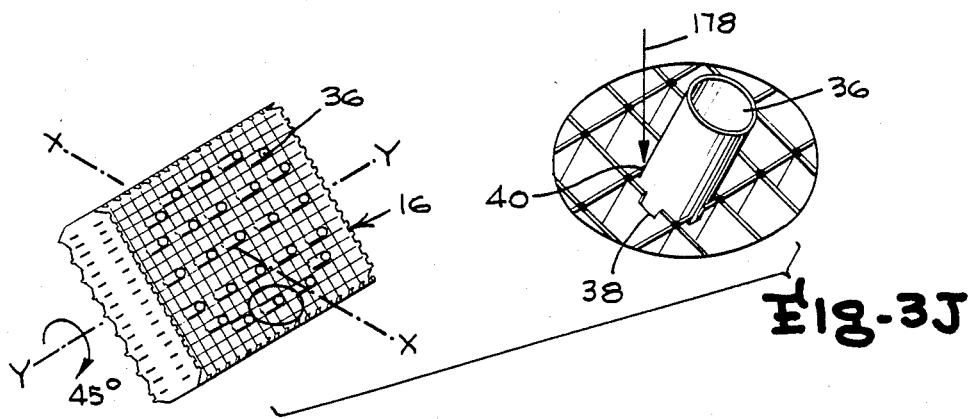
Figure 3K:
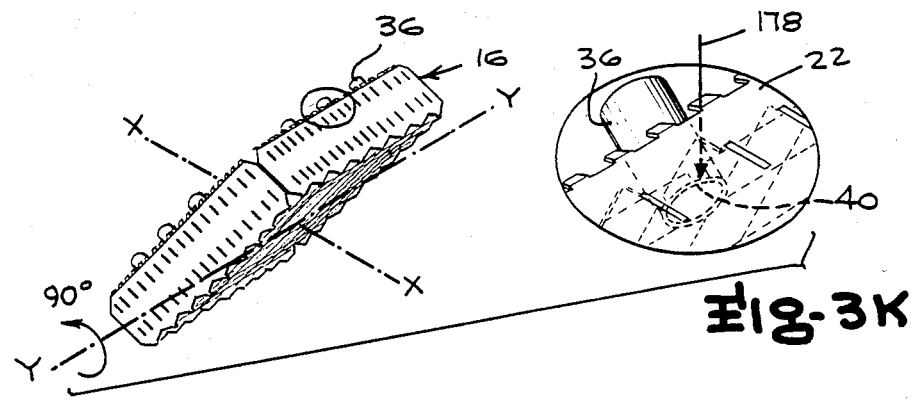
Figure 3L:
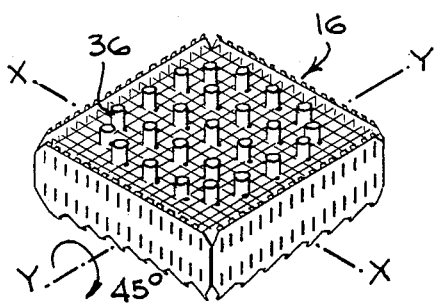

Referring now to FIGS. 3I to 3L, there is shown the process by which the guide sleeves 36 are welded to the fuel rod grid 16. Initially, the fuel rod grid 16 is removed from its welding fixture as required for the steps in FIGS. 3A to 3H and placed into a sleeve welding fixture as described in the copending application entitled "FUEL GRID WITH SLEEVES WELDED IN NOTCHED GRID STRAPS" (Westinghouse Case No. 49,420); the sleeve welding fixture includes a plurality of fixture pins disposed through selected of the cells formed by the inner grid straps 20 for receiving the guide sleeves 36, i.e. those openings having the notches 38 disposed in the peripheral edges thereof as seen in FIG. 3J. In particular, the fixture pins accurately position the guide sleeve 36 so that their axes are disposed centrally of and parallel with the surfaces of the inner grid straps 20. With the guide sleeves 36 accurately aligned and assembled with respect to the fuel rod grid 16, the grid 16 and its sleeve welding fixture are disposed into the welding chamber and affixed with respect to the chamber and to the laser beam 178. Thereafter, the air is purged with argon gas to the desired level of purity. Thereafter, as shown in FIG. 3J, the fuel rod grid 16 is rotated 45° in a counter-clockwise direction and thereafter the grid and sleeve welding fixture is locked into that position at 45° with respect to the path of the laser beam 178 as shown in FIG. 3J. Thereafter, a series of notch seam welds 40 is carried out at a pulse width of 6.2 ms, at a pulse frequency of 20 PPS, an average power of 255 watts and at a welding speed of 10 IPM. The fuel rod grid 16 is moved along the Y axis at the noted rate while the laser beam 178 is pulsed. As will be explained in detail later, it is necessary to refocus the laser beam 178 for each horizontal row of guide sleeves 36 as shown in FIG. 3J. A series of notch seam welds 40 is effected by moving the fuel rod grid 16 along its Y axis, bringing each guide sleeve 36 into position with respect to the laser beam 178, turning on the laser beam to effect the notch seam weld 40, and thereafter moving the fuel rod grid 16 to align the next guide sleeve 36. After a single horizontal row of guide sleeves 36 has been welded, the fuel rod grid 16 is moved along its X axis to position the next row of guide sleeves 36 in alignment with respect to the laser beam 178. Thereafter, it is necessary to refocus the laser beam 178 to effect the notch seam welds 40. As seen in FIGS. 3J and 3K, the guide sleeve 36 fits into four notches 38, and notch seam welds 40 are effected on opposing sides of the guide sleeves 36.

After one side of the guide sleeve 36 has been welded, it is necessary to rotate the grid 16 90° in a counter-clockwise direction as shown in FIG. 3K to expose the other, opposing notch 38 to the laser beam 178. After rotation, a series of notch seam welds 40 is carried out as explained above. Finally, in step FIG. 3L, the fuel rod grid 16 is rotated 45° in a clockwise direction to its original position before the grid 16 and its sleeve welding fixture are removed from the welding chamber to complete the welding steps of the fuel rod grid 16.

Referring now to FIG. 4, there is shown the laser welding system 100 for controlling the series of welds and in particular the intersect welds 32, the slot and tab welds 34, the corner seam welds 30, and the notch seam welds 40 necessary to secure the inner and outer grid straps 20 and 22 together to form the fuel rod grid 16 and to secure the guide sleeves 36 to the grid 16 by controlling a laser system 102 (shown in detail in the subsequent drawings) to emit a laser beam 178 of controlled energy to successively and precisely position the grid 16, and to control the supply of a suitable inert gas, e.g. argon, in which to carry out the laser welding of the aforementioned welds. Each of the work pieces, e.g. the fuel rod grids 16, is successively moved to each of the weld positions by its positioning module 106a or 106b, the module 106a being shown in FIG. 4. In particular, a welding chamber 108 is associated with each of the positioning modules 106 for receiving its grid to establish an environment in which the laser welding may be carried out and, in particular, to establish an atmosphere of the inert gas while permitting movement of the grid 16 to effect the series of welds. The right positioning module 106a has a right cabinet door 114a, which is shown in an open position. A like left cabinet door 114b is shown in its closed position and is understood to cover its corresponding left positioning module 106b and left welding chamber 108b. A cabinet 104 further encloses the right and left positioning modules 106a and 106b, as well as the laser system 102, a main frame 122, an argon purging system 118, and an argon supply system 473 (which is not part of the hereinafter claimed invention, but is shown in FIG. 7 of previously incorporated-by-reference U.S. patent application Ser. No. 414,205) to be described below. A pair of sensing mats form right and left safety zones 134a and 134b disposed immediately in front of the right and left positioning modules 106a and 106b respectively; the zones 134a and 134b sense the presence of an operator thereon to prevent the driving of its corresponding welding chamber 108 into a position outside of the cabinet 104.

A laser power supply 120 is shown in FIG. 4 and is coupled by suitable conductors to the laser system 102 to control the emission of coherent light therefrom in a manner to be more fully explained below. In addition, there is included a computer control system 124 including a first Computer Numerical Control (CNC) system 126a and an identical second CNC 126b, associated respectively with controlling the lasing operations as occur within the right and left positioning modules 106a and 106b. As will be explained later, the first and second CNC's 126a and 126b bid for control of the laser system 102 whereby the CNCs time share the control of the laser system 102. The laser power supply 120 includes a laser welding display panel 132, and each of the CNC's 126a and 126b includes respectively its machine function panel (MFP) 130.

The main frame 122 is more fully shown in FIG. 5 for mounting adjustably the laser system 102 in an aligned position with respect to the right and left positioning modules 106a and 106b. Once aligned with the laser system 102, the right and left positioning modules 106a and 106b are fixedly secured with respect to the main frame 122 and therefore with respect to the laser system 102 to ensure that the alignment of the laser beam 178 may be accurately controlled with respect to each of the positioning modules 106a and 106b and therefore with respect to the fuel rod grids 16 carried thereby. The main frame 122 is made up of a top plate 142 and a bottom plate 143 (see FIG. 7), each welded to a frame of square tubing. As shown in FIG. 7, leveling and shock pads 224 are attached to the bottom plate 143 and serve to isolate the laser system 102 and the right and left positioning modules 106a and 106b from vibrations that might be imparted to the laser welding system 100 through the floor on which the laser welding system 100 rests. In addition, the pads 224 also dampen any vibrations that might be caused by the motor drives (to be described) associated with each of the right and left positioning modules 106a and 106b. The top plate 142 is machined flat after it has been welded to its frame of square tubings to provide a reference surface for the other system components that are mounted thereon. These other components are bolted or doweled to or with respect to the top plate 142 so that the critical alignments can be maintained.

Figure 9:
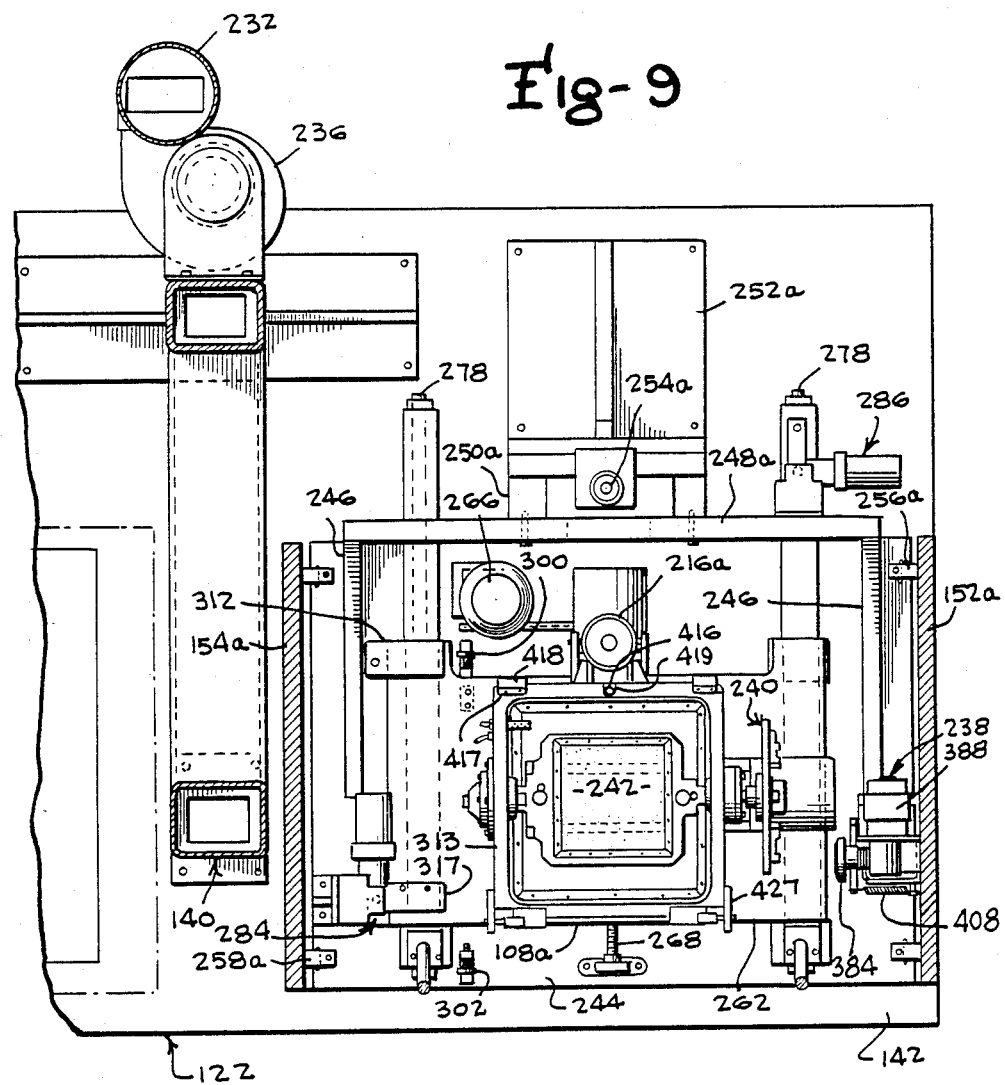
FIG. 9 is a plan view of the laser welding system taken along line IX—IX of FIG. 8.

A kinematic support 140 is bolted to the top plate 142 and comprises a pair of legs 141 and 139 each having a dowel pin securing it with respect to the top plate 142. Each of the positioning modules 106 is mounted on the main frame 122 and comprise, as shown in FIG. 5, a base plate 150 bolted to the top plate 142 at each of its four corners. Each positioning module 106 includes side walls 152 and 154, each bolted to the base plate 150, as shown in FIGS. 5 and 10. Each module 106 includes a back wall or vertical support 248, as shown in FIG. 10. A vertical slide 252 is bolted in turn to two gussets 246, as shown in FIG. 10; an X-Y platform 244 is in turn bolted to the two gussets 246 one on either side, as shown in FIG. 9. As shown in FIG. 10, the X-Y platform 244 receives and mounts an X-Y positioning system 288 by which its welding chamber 108 is incrementally moved along X and Y axes under the control of its CNC 126. Each of the positioning modules 106 further includes as shown in FIG. 5, a top or sealing plate 156 that is disposed in a close spacing, (i.e. less than 0.040 inch) from, and in a substantially parallel relationship with, the upper flange 331 that forms the top surface 333 of its welding chamber 108, as shown in FIG. 8. Inspection of FIG. 8 will indicate that the critical spacing and relationship between the welding chamber 108 and its sealing plate 156 permit the X-Y positioning system 288 to move the welding chamber 108 while maintaining the relationship of the welding chamber 108 to the sealing plate 156. This critical relationship is established by accurately positioning the platform 244 with respect to the sealing plate 156 in a manner as will be explained.

As shown in FIGS. 7 and 9, a pair of vertical slides 252 are fixedly secured by dowels to the top plate 142. In particular, two dowel pins fit through the base of each vertical slide 252 and hold it to the top plate 142. A saddle 250 is movably mounted upon each vertical slide 252 and includes a positioning screw 254 extending in a substantially perpendicular relationship to the referenced surface of the top plate 142, whereby its saddle 250, its vertical slide 252, and the platform 244 may be critically aligned. The saddle 250 is bolted and doweled to the vertical slide 252 of the positioning module 106. The saddle 250 and its positioning screw 254 are illustratively that model as manufactured by Milwaulkee Machine Components Company under their designation Model RB16-32-20-L. The vertical slides 252 provide means for raising or lowering the X-Y platform 244 to accommodate changes in the process or in the height of the welding chamber 108. Three dowels secure the X-Y platform 244 to its gussets 246 and may be removed therefrom to free the X-Y platform 244. Then the sets of gib keys 256 and 258 are pulled by means of their jacking screws. Next, a crank (not shown in the drawings) associated with the positioning screw 254 is turned to reposition up or down the X-Y platform 244, and thereafter the vertical slide 252 is bolted and doweled to its saddle 250, and the X-Y platform 244 is bolted to the vertical slide 252. When the X-Y platform 244 is at the required height, it is leveled, i.e. the spacing between the top of the welding chamber 108 and the bottom surface of the sealing plate 156 is made parallel with each other, and thereafter, new gib keys 256 and 258 are positioned, and the dowel pins are refitted in new holes drilled and reamed in the side walls 152 and 154 at their new locations.

The argon purging system 118 is more fully shown in FIGS. 4, 5 and 7. Argon that spills out of the welding chambers 108 during purging and welding falls to the bottom of each positioning module 106 to flow through a plurality of exhaust openings 151 within the base plates 150a and 150b. In the front of the main frame 122 are two openings 148a and 148b covered by wire mesh 146. The wire mesh 146 and the main frame 122 form a pair of plenums 144a and 144b which are connected by an exhaust duct (not shown) at the back of the main frame 122 via a damper 226 (see FIG. 7), and a duct 228 to a blower assembly 230, whereby the argon spillage is forced from the cabinet 104 via an argon exhaust conduit 232 from the building. The damper 226 controls the rate of argon flow. The blower assembly 230 creates a negative pressure or vacuum when the cabinet doors 114 are closed. The blower assembly 230 may illustratively take the form of an exhaust blower as manufactured by Dayton Electric Company under their Model 2C887. The spacing between the upper surface of the welding chamber 108 and the sealing plate 156 as shown in FIG. 8 is typically in the order of 0.030 inch to permit the movement of the welding chamber 108 along X and Y axes, as well as to permit an even flow of the argon from the welding chamber 108.

As shown in FIG. 5, the kinematic support 140 positions the laser system 102 (and in particular, the source of laser emission in the form of a laser rod 170 and the related optics) with respect to the reference surface of the main frame 122 and more specifically with respect to the work pieces in the form of the fuel rod grids 16. The laser rod 170 is disposed within a laser head housing 166 and is mounted upon an optical tooling plate 168 which has been machined to very close tolerances for flatness. The optical tooling plate 168 is mounted upon a laser subbase 162 which is in turn supported upon the kinematic support 140 and, in particular, upon its cross beam 157 and horizontal member 159. In addition to the laser head housing 166, a movable beam switching mirror 172 and its actuator in the form of a stepping motor 175 and stationary beam diverters in the form of mirrors 174, 176a and 176b are also mounted upon the optical tooling plate 168. As shown in FIG. 6, the beam switching mirror 172 takes the form of a tear drop shaped member coupled to the stepping motor 175 to be successively rotated by the motor 175 into and out of position to reflect or to transmit the laser beam 178 emitted from the laser rod 170.

The laser subbase 162 supports the optical tooling plate 168 and, in turn, is mounted upon the kinematic support 140. The kinematic support 140 is a weldment made of square tubing and provides the rigidity necessary to maintain the critical alignment between the laser beam 178 emitted from the laser rod 170, and the fuel rod grids 16. The laser subbase 162 is bolted to a pair of leveling jacks 158a and 158b disposed at either end of the cross beam 157. A spherical bearing 160 is disposed on a rearward portion of the horizontal member 159 to provide a single point of support for the laser subbase 162, whereby it may rotate about an axis 164 as each of the front leveling jacks 158a and 158b is raised or lowered. The spherical bearing 160 is disposed at a fixed height to provide a pivot about which the laser subbase 162 may be either lifted straight up or tilted to the required angle by the leveling jacks 158a and 158b.

The plane of the laser subbase 162 must remain rigid while the jacking forces are applied thereto by the leveling jacks 158A and 158B during the initial alignment of the laser welding system 100. As will be explained below, the laser subbase 162 also supports a pair of Z-axis laser assemblies 222 (see FIG. 7), whereby corresponding laser focusing lens assemblies 204 (see FIG. 6) may be rectilinearly adjusted to focus the laser beam onto the fuel rod grids 16 within the corresponding welding chambers 108. The laser subbase 162 provides a bolting surface for mounting the Z-axis positioning assemblies 222 (see FIG. 7). Each Z-axis laser assembly 222 is rigidly secured to the laser subbase 162 so that it carries the laser focusing lens assembly 204 along its Z-axis that is perpendicular to the top surface of the laser subbase 162. As shown in FIGS. 5 and 6, the laser rod 170 emits a laser beam 177 that is focused onto the beam switching mirror 172, which alternately directs the laser beam 177 first to the vertical directing mirror 176a and then to the vertical directing mirror 176b, thus forming a right laser beam 178a and a left laser beam 178b. The laser beams 178a and 178b are directed through openings 180a and 180b within the positioning modules 106a and 106b respectively.

The laser system 102 as shown in FIG. 5 and schematically in FIG. 6 may, in one illustrative embodiment of this invention, take the form of that laser system manufactured by Raytheon under their model designation number SS500. The laser system 102 includes the laser rod 170 illustratively taking the form of a Nd:YAG crystal laser and a pair of linear krypton flash lamps disposed in a high efficiency laser head. The laser head includes a total reflecting mirror 182 and a partial reflecting mirror 184 disposed on either end of the laser rod 170. An inner cavity shutter 188 is disposed between the laser rod 170 and the total reflecting mirror 182 and is selectively controlled to release a selected number of lasing pulses, whereby the energy imparted to effect laser welding may be precisely controlled in a manner to be explained below. The laser head is modularly constructed to permit all optic elements thereof including the laser rod 170, the excitation lamps 186, and the mirrors 182 and 184 to be easily and independently replaced. The excitation lamps 186 shall be quickly replaced without disturbing the optical alignment. Further, the excitation or flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW, when operating at pulse widths of 6 ms and 2 ms and pulse rates of 20 Hz and 50 Hz respectively. A dump shutter 190 is disposable in a first position to direct the laser beam 177 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 177 is focused by a beam expander lens assembly 198 to a beam directing mechanism comprised of the movable beam switching mirror 172 and the stationary mirror 174. When the switching mirror 172 is disposed to intercept the laser beam 177, it is diverted along path 178a to the vertically directing mirror 176a to be directed vertically. The laser focusing lens assembly 204a intercepts and focuses the laser beam 178a onto the fuel rod grid 16 within the chamber 108a. As shown, the laser focusing lens assembly 204, as will be described in detail later, includes a lens 202 and a lens carrier tube 200 as rectilinearly positioned by the Z-axis laser assembly 222. When the switching mirror 172 is rotated by the motor 175 from a position intercepting the laser beam 177, it is diverted by the stationary reflective mirror 174 to form the laser beam 178b as directed by the vertically directing mirror 176b towards the welding chamber 108b.

The excitation lamps 186 are energized by the power supply 120, generally shown in FIG. 4. The power supply 120 illustratively comprises a voltage regulated DC power supply which charges a pulse forming network (PFN) through a charging inductor. The related CNC 126 alternately closes switches (silicon controlled rectifiers) that charges the PFN from the DC power supply reservoir capacitor bank and discharges the PFN into the excitation lamps 186 to thereby excite the laser rod 170 to emit a series of laser pulses. The excitation lamps 186 shall operate in a "simmer" mode of operation, in which the lamps 186 are operated at a low DC current level below lasing threshold, and high current pulses are superimposed on the simmer current for generating laser pulses. The PFN shall provide pulses of 2 ms and 6 ms.

To assist in the initial alignment of the weld chamber 108 and, in particular, the fuel rod grid 16 with respect to the laser beam 178, there is provided means for sighting the grid 16 and, in particular, to determine its exact position with respect to laser beam 178 in the form of an alignment TV camera 206 that is aligned to establish an image path 214 coinciding with the path of the laser beam 178a. As shown in FIG. 6, the image path 214 is focused by a lens 210, selectively passed by a Bureau of Radiological Health (BRH) or safety shutter 212 and directed through the partially transmissive mirror 176 to the TV camera 206. The lens 202, in addition to focusing the laser beam 178 onto the fuel rod grid 16, also focuses with the assistance of lens 210 the image of the grid 16 onto the TV camera 206. As will be explained below, the laser focusing lens assembly 204 also includes an illuminating lamp that is selectively energized to illuminate the grid 16 for alignment purposes. The BRH shutter 212 is selectively opened and closed to permit alignment of the grid 16 with respect to the laser beam 178, remaining closed during all other periods as a safety measure.

As illustrated in FIG. 6, each of the welding chambers 108 may be moved from a first, welding position as shown in the dotted line to a second, out position. When the welding chamber 108 is in its first position, the laser beam 178 is directed by its vertically directing mirror 176 onto a power measuring device or thermopile 218, as supported within a shield tube 216. As will be shown later, the shield tube 216 is mounted on a rearward portion of the welding chamber 108 and includes a restricted opening 220 whereby the laser beam 178 may be effectively confined within the shield tube 216. Periodically, the welding chamber 108 is disposed to its second, out position and the laser beam 178 is directed onto the thermopile 218 to provide an indication of the power output of the laser rod 170 actually impinging onto the fuel rod grid 16. Under the heavy duty load imposed upon the laser system 102, it is contemplated that the laser efficiency will attenuate due to the exhaustion of the laser rod 170 and/or its excitation lamps 186, as well as due to the presence of smoke and debris given off during the laser welding. Thus, in order to provide accurate, reproducible welds, the voltage applied to the excitation lamps 186 is increased over the life of the laser system 102 dependent upon the thermopile measurements.

The cabinet 104 of the laser welding system 100 serves to confine the argon escaping from the welding chambers 108 so that it may be exhausted by the argon purging system 118 as described above. In order to permit the welding chamber 108 to be brought to its second, out position, wherein the work piece and, in particular, the fuel rod grid 16 may be replaced, the cabinet doors 114 are mounted to be rectilinearly moved to an open position as shown in FIG. 4. In an illustrative embodiment of this invention, a door opening mechanism 234 is shown in FIG. 7 as comprising two cable cylinders that are bolted to the main frame 122. An auxiliary air cylinder keeps constant tension on the cable and takes up stretch that occurs during operation of the cabinet doors 114. The air pressure on these cylinders is controlled by a regulator. The air to the cable cylinders is controlled by a solenoid valve. The doors 114 are permitted to move along rails mounted upon blocks. In an illustrative embodiment of this invention, the air operated cable cylinders may take the form of those devices as manufactured by Tolomatic under their model number 100-150.

Referring now to FIGS. 8, 9 and 10, there is shown a slide table 262 that permits the welding chamber 108 to be removed from the cabinet 104 to its second, out position, whereby the machine operator may remove the fuel rod grid 16 from the welding chamber 108. To this end, the slide table 262 is mounted upon the accurately positioned X-Y platform 244 to be positively driven by a slide driver motor 266 in a rectilinear fashion between its first welding position and its second, out position with respect to the cabinet 104. The slide table 262 includes a safety rail 264 that protrudes in advance of the leading edge of the slide table 262 to prevent operator injury. The slide drive motor 266 is coupled by a drive chain 272 to a screw drive 268 which is threadably received by a shoulder bolt 274 to drive a support bracket 276 fixedly attached to the slide table 262. As particularly shown in FIG. 10, the screw drive 268 is mounted at either end upon a pair of pillow blocks 270. As more fully shown in FIGS. 8 and 9, there are provided a pair of bearing shafts 278 fixedly secured to the underneath surface of the slide table 262 and oriented substantially parallel with each other to permit the desired rectilinear travel of the slide table 262 between its first and second positions.

Referring now to FIGS. 8 and 9, means are shown for accurately positioning the X-Y platform 244 and therefore the welding chamber 108 in its first, welding position within its positioning module 106 and in its second, out position removed from the cabinet 104, wherein the operator may readily remove the fuel rod grid 16 from the welding chamber 108. It is critical that the welding chamber 108 and in particular, its fuel rod grid 16 be disposed accurately with respect to the laser beam 178 as shown in FIGS. 6, 8 and 9. To this end, a front locator assembly 284 selectively directs its locator pin 316 as shown in FIG. 8 from a first, withdrawn position, to a second, locking position, wherein it is disposed within an opening 318 of a positioning member 317 fixedly attached to the slide table 262 to thereby precisely position the slide table 262 with respect to the laser beam 178. A similar positioning member 312 is disposed at a rearward portion of and is fixedly attached to the slide table 262 to engage the locator pin 316 of the front locator assembly 284, to thereby position and hold the slide table 262 and therefore the welding chamber 108 in its second, out position. As more specifically shown in FIG. 8, the front locator assembly 284 includes a locator bracket 322 fixedly attached to the platform 244 at one end and having at its other end a crangor bracket 320 from which is suspended by a clevis 324, an actuator 314 for driving the locator pin 316. A second or back locator assembly 286 is shown in FIGS. 7 and 9 and serves to fixedly secure the slide table 262 with respect to the laser beam 178. The back locator assembly 286 is fixedly secured to its positioning module 106 by a locator bracket 323 attached to the vertical support 248 and includes an actuator 315 and a locator pin 319 driven thereby from a first, withdrawn position to a second, locking position, whereby the locator pin 319 engages an opening 325 of a positioning member 321 affixed to the slide table 262. In this manner, the slide table 262 is affixed at diagonally opposed corners by the locator pins 319 and 316 of the back and front locator assemblies 286 and 284, respectively, thus ensuring a fixed relationship between the table slide 262 and the laser beam 178. The front and back locator assemblies 284 and 286 may illustratively take the form of plunger mechanisms as manufactured by DeStaco.

Referring now to FIGS. 8 and 10, each of the positioning modules 106 includes means for precisely positioning the welding chamber 108 and, in particular, the fuel rod grid 16 contained therein in a plurality of precisely controlled positions along X and Y axes of a plane, as well as to rotate that plane at a precisely controlled angle about the Y axis, whereby a variety of welds may be effected by the laser beam 178. The X-Y positioning system 288 is disposed as shown in FIG. 10 as being mounted upon the slide table 262 for supporting and positioning the welding chamber 108. The X-Y positioning system 288 includes an X positioning table 290 and a Y positioning table 292 mounted thereon. The X and Y positioning tables 290 and 292 may illustratively take the form of that mechanism as manufactured by the Shaum Manufacturing Company under their product number DC1212. The X positioning table 290 serves to move the chamber 108 in a direction substantially perpendicular to the plane of FIG. 8, whereas the Y positioning table 292 moves the chamber 108 along a direction perpendicular to the plane of FIG. 10. The Y positioning table 292 is associated with a Y drive motor 296 that includes a resolver and tachometer, whereby precise incremental distances may be imparted to the welding chamber 108. Similarly, the X positioning table 290 is associated with an X drive motor, resolver, and tachometer 294.

A B axis rotation drive 238 as generally shown in FIG. 9 is engageable with the welding chamber 108 and in particular with a rotatable fixture assembly 240 as rotatably mounted within a side wall of the welding chamber 108 to rotatably position a rotatable fixture 242 as shown in FIG. 9. It is understood that the fuel rod grid 16 is attachable to the rotatable fixture assembly 240, whereby it may be rotatably disposed about the Y axis.

The welding chamber 108 and its rotatable fixture assembly 240 is shown in FIGS. 8 and 9, as comprising an upper flange 331 disposed around the upper periphery of the chamber's walls to provide a machined, flat surface 333 that is disposed in a close, precisely parallel relationship with the lower surface of the sealing plate 156. This precise relationship between the surface 333 and the sealing plate 156 permits the even flow of the argon from the welding chamber 108 into the positioning module 106, as well as the movement of the welding chamber 108 and its fuel rod grid 16 along the X, Y axes of a plane substantially parallel to the lower surface of the sealing plate 156. In addition, the X-Y positioning system 288 is permitted to move the welding chamber 108 and, in particular, the fuel rod grid 18 freely along its X and Y axes with respect to the laser beam 178 without interference from any seal, i.e. there is provided a carefully maintained, uniform gap between the peripheral edge or flange 331 of the welding chamber 108 and the sealing plate 156.

As shown in FIGS. 7 and 8, the expandable bellows 456 is connected to the top most portion of the lens carrier tube 200 and to a protective housing 461 by a bellows adapter 464. The Z-axis laser assembly 222 includes a Z-axis table 458 upon which the laser focusing lens assembly 204 is mounted by the lens mounting assembly 460, and is incrementally, selectively driven by a Z-axis drive motor 470 as shown in FIG. 7. In a manner similar to the X and Y drive motors 294 and 296, the Z-axis drive motor 470 also includes a resolver and a tachometer to provide output signals indicative of the precise position of the Z-axis table 458, as well as its speed of movement. The Z-axis table 458 is mounted in a vertical position thereby imposing a force upon the Z-axis drive motor 470 which is counter-balanced by a pair of spring powered reels 466 that are coupled respectively by cables 472 disposed about the reels 466 and secured to the Z-axis table 458 by a suitable securing means such as a screw 468. The Z-axis table 458 may in one illustrative embodiment of this invention take the form of a table as manufactured by Design Components, Inc., under their designation SA100. The coupling between the Z-axis drive motor 470 and the Z-axis table 458 may illustratively take the form of those components manufactured by Shaum Manufacturing, Inc., under their designations "Heli-Cal" Nos. 3477-16-8 and 5085-8-8. The Z-axis drive motor 4780 may illustratively take the form of that DC servo controller as manufactured by Control Systems Research, Inc., under their designation SM706RH.

Thus, there has been shown a laser machining apparatus and in particular, a rigid structure therefor for providing a bed for receiving at least one work piece and a frame for rigidly supporting a laser source with respect to the work piece. The rigid bed defines a first substantially planar reference surface for receiving the work piece. The work piece is typically disposed within a machining chamber for defining about the work piece an environment that is non-reactive to the material of which the work piece is made. A part of the machining chamber is formed by a sealing surface presented by a work piece housing that is fixedly attached to the reference surface. The machining chamber is disposed upon a platform that is adjusted by a suitable mechanism so that the uniform gap is established between the peripheral surface of the machining chamber and the sealing surface to permit free movement of the machining chamber and to maintain the machining chamber environment. In this regard, the platform once positioned is fixedly secured with respect to the work piece housing and thus the reference surface. Further, means are provided for moving the machining chamber and its work piece along a pair of axes that defines a plane substantially parallel with the sealing surface. A rigid frame is disposed upon the reference surface for mounting a laser source and, in particular, a laser subbase that is adjustably positioned. In one embodiment, the positioning means may include a stationary bearing surface and at least two adjustable mechanisms for lifting and/or rotating the subbase about a subbase axis coincident with the bearing surface. The laser source, a beam directing mechanism for time sharing its laser beam between a first work piece and a second work piece, and a corresponding pair of laser focusing assemblies are also mounted upon the subbase.

In considering this invention, it should be remembered that the present disclosure is illustrative only and the scope of the invention should be determined by the appended claims.

I claim:

1. Apparatus for laser machining, comprising:
   (a) rigid bed means resting on a support surface for defining a first substantially planar, reference surface;
   (b) laser means for emitting a laser beam;
   (c) means affixed to said reference surface for rigidly mounting said laser means with respect to said reference surface;
   (d) a platform;
   (e) work piece housing means affixed to said reference surface for defining and disposing a second, substantially planar sealing surface with respect to said first reference surface;
   (f) a machining chamber for receiving the work piece and having an upper opening defining a third, substantially planar peripheral surface, said machining chamber being disposed on said platform;
   (g) adjustable means for positioning said platform and said machining chamber mounted thereon so that said third peripheral surface is disposed substantially parallel with respect to said second sealing surface and spaced therefrom a distance sufficiently small to ensure the integrity of the machining environment within said machining chamber; and
   (h) fastening means for directly affixing said platform to said work piece housing means once said third peripheral surface has been so positioned with respect to said second sealing surface.

2. Laser machining apparatus as claimed in claim 1, wherein there is included drive means mounted upon said platform for moving said machining chamber with respect to the laser beam and with respect to said second sealing surface.

3. Laser machining apparatus as claimed in claim 2, wherein said drive means moves said machining chamber and its work piece along at least first and second axes that define a plane that is substantially parallel with respect to said second sealing surface.

4. Laser machining apparatus as claimed in claim 2, wherein there is included a fixture rotatively mounted within said machining chamber.

5. Laser machining apparatus as claimed in claim 4, wherein there is included locator means for releasably locking the work piece with respect to said rotatable fixture and to the laser beam.

6. Laser machining apparatus as claimed in claim 1, wherein there is included means for pumping a gas non-reactive to the material of which the work piece is made, into said machining chamber at a selected rate.

7. Laser machining apparatus as claimed in claim 6, wherein the selected rate is set to ensure that the gas flowing from said machining chamber through a uniform gap formed between said third peripheral surface and said second sealing surface is sufficiently small to prevent the interchange of the non-reactive gas and any reactive gas on the exterior of said machining chamber.

8. Laser machining apparatus as claimed in claim 1, wherein there is included a slide for receiving said machining chamber thereon and mounted for movement between a first position, wherein said welding chamber is disposed so that its third, peripheral surface is disposed adjacent said second sealing surface, and a second position, remote from said second sealing surface, wherein the work piece may be readily inserted into and withdrawn from said machining chamber.

9. Laser machining apparatus as claimed in claim 8, wherein there is included releasable locking means for accurately positioning and locking said slide in its first position, whereby the laser beam is precisely directed onto the work piece.

10. Apparatus for laser machining a work piece, comprising:
  (a) rigid bed means resting on a support surface for defining a first, substantially planar reference surface;
  (b) laser means for emitting a laser beam;
  (c) a laser subbase defining a second substantially planar surface for receiving and mounting said laser means;
  (d) rigid frame means affixed to said first reference surface for adjustably mounting said laser subbase;
  (e) a work station disposed on said first reference surface for receiving the work piece;
  (f) means for focusing and directing the laser beam; and
  (g) means affixedly mounted on said frame means for adjusting the position of said second surface so that said laser beam is precisely directed onto the work piece.

11. Laser machining apparatus as claimed in claim 10, wherein said adjusting means includes means for adjusting the height of said second surface with respect to said first reference surface.

12. Laser machining apparatus as claimed in claim 10, wherein said adjusting means comprises means for rotating said second surface with respect to said first reference surface.

13. The laser machining apparatus as claimed in claim 12, wherein said adjusting means comprises a bearing for rotatively receiving said laser subbase, said laser subbase having an axis intersecting said bearing, whereby said second surface may be rotatably disposed by said adjusting means about said axis.

14. Laser machining apparatus as claimed in claim 13, wherein, said adjusting means includes first and second height adjusting means disposed on opposing sides of said axis, whereby the height of said second surface, as well as the angle of said second surface, may be adjusted with respect to said first reference surface.

15. The laser machining apparatus as claimed in claim 10, as adapted to laser machine first and second work pieces, wherein there is further included beam directing means disposed to intercept the laser beam for directing the laser beam along a first laser path to the first work piece at a first instant in time, and for directing the laser beam along a second laser path to the second work piece, at a second different instant in time.

16. Laser machining apparatus as claimed in claim 10, wherein there is included means mounted upon said second surface for focusing the laser beam onto the work piece.

17. Laser machining apparatus as claimed in claim 15, wherein there is included first and second focusing means mounted upon said second surface for respectively focusing the laser beam respectively along said first and second laser paths onto said first and second work pieces.

18. Laser machining apparatus as claimed in claim 10, wherein there is included work piece housing means affixed to said first reference surface and defining a third substantially planar sealing surface, and a machining chamber for receiving the work piece and for defining about the work piece an environment that is non-reactive to the material of which the work piece is made, said machining chamber having an opening defining a peripheral surface, and means for positioning said machining chamber to define a substantially uniform gap between said peripheral surface and said third sealing surface to permit free movement of said machining chamber with respect to said third sealing surface and being sufficiently small to maintain the environment within said machining chamber.

* * * * *